Oct. 7, 1947.     U. L. COURSON     2,428,515
WIND AND WATER MOTOR
Filed June 3, 1946     2 Sheets-Sheet 1

U. L. Courson
INVENTOR.

BY
ATTORNEYS.

Patented Oct. 7, 1947

2,428,515

UNITED STATES PATENT OFFICE 2,428,515

WIND AND WATER MOTOR

Ula L. Courson, Remerton, Ga.

Application June 3, 1946, Serial No. 674,002

1 Claim. (Cl. 170—23)

This invention relates to a power wind and water wheel construction, the prior object of the invention being to provide a wind and water wheel wherein the pivoted blades thereof will automatically trail, when moving into the wind or against the flow of water in a stream in which the wheel is positioned.

An important object of this invention is to provide a water wheel of this character wherein the number of moving parts will be reduced to a minimum since the blades are mounted in such a way that the supporting arms or spokes of the wheel provide stops against which the blades engage when the sides of the pivoted blades are presented to the wind or water pressure.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Figure 1:
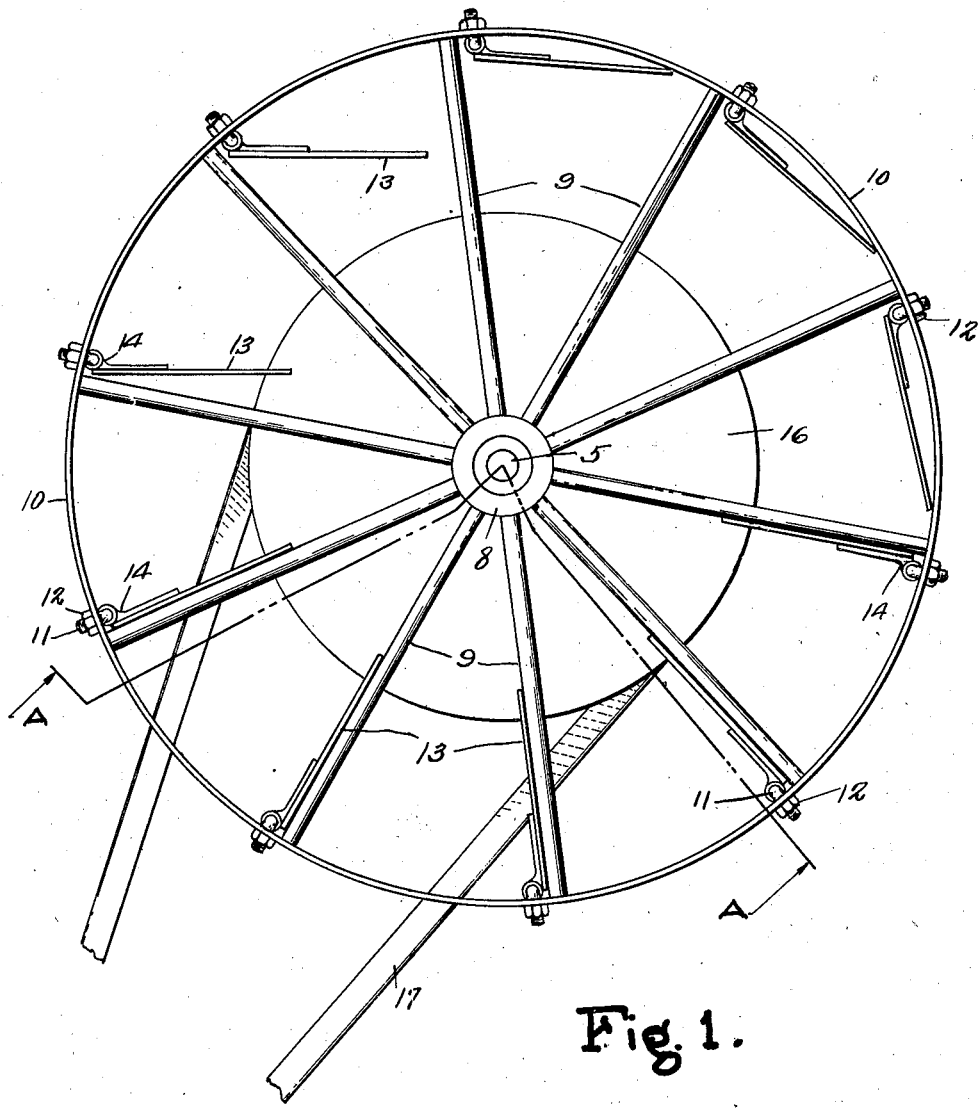
Figure 1 is a plan view of a power wheel constructed in accordance with the invention.

Referring to the drawings in detail, the reference character 5 indicates the main or supporting shaft of the wheel, and in the present showing, the shaft is vertically disposed, the lower end thereof, being mounted in the bearing 6 which rests on the ball 7 at the bottom of the bearing.

Reference character 8 indicates the hub of the wheel from which the spokes 9 radiate, the spokes 9 being arranged in pairs at the upper and lower ends of the hub. The outer ends of the spokes 9 connect with the bands 10, which bands hold the spokes in their proper spaced relations with respect to each other.

Connecting the upper and lower bands 10, are rods 11 which have their ends extended laterally and secured within openings of the bands 10, the ends of the rods being provided with nuts 12, whereby the rods are secured in position.

These rods 11 form supports for the blades 13, which are formed with bearings 14 secured adjacent to the ends thereof, the bearings accommodating the rods 11, as clearly shown by the drawings.

The positions of the plates 13 are such that when the blades swing under the action of the wind or water pressure, they will contact the spokes 9 and transmit movement to the wheel.

It is obvious that as the blades swing into the air pressure or water pressure, they will trail eliminating resistance to permit the wheel to turn under the wind or water pressure.

Figure 2:
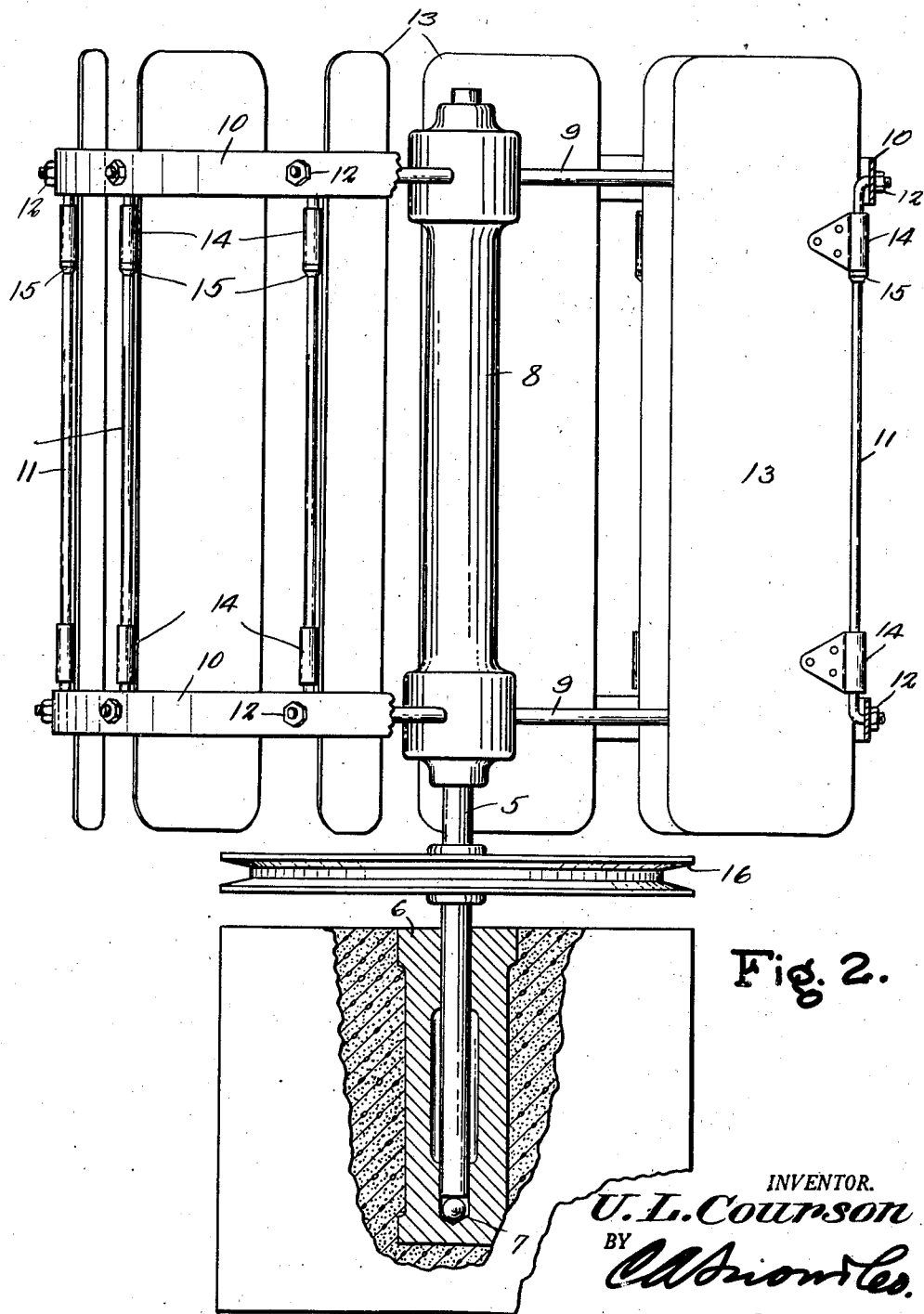
Figure 2 is a sectional view taken on line a—a of Figure 1.

In the present showing, the wheel is illustrated as a wind wheel, the shaft 5 being vertically disposed. In this case a stop 15 is provided on each rod 11, the stops providing recesses for the blades 13, the upper bearings 14 resting against the stops, as clearly shown by Figure 2 of the drawings.

It will, of course, be understood that when the wheel is used as a water wheel, the locations of these stops may be varied to meet requirements of use.

The reference character 16 indicates a pulley which is secured to the shaft 5 and over which the belt 17 operates and by means of which power may be taken from the wheel.

From the foregoing it will be seen that due to the construction shown and described, I have provided a wind or water wheel embodying but few parts, the use of levers, rack bars or the like for controlling the movements of the blades having been eliminated.

What is claimed:

A power wheel embodying a vertical shaft, a hub secured on the shaft, pairs of upper and lower spokes radiating from the hub, bands secured to the outer ends of the spokes, rods connecting the bands, said rods having right-angled upper and lower ends extending through openings in the bands, nuts on the ends of the rods securing the rods to the bands, blades pivotally mounted on the rods, said blades being of lengths to extend beyond the bands, said blades adapted to engage the spokes under wind pressure directed to the blades, said blades adapted to trail as the wheel moves into the wind, and said wheel adapted to be rotated by air pressure directed against the sides of the blades.

ULA L. COURSON.

REFERENCES CITED

The following references are of record in the file of this patent:

UNITED STATES PATENTS

| Number | Name | Date |
|---|---|---|
| 99,980 | Vaughn | Feb. 15, 1870 |
| 1,190,628 | Clade | July 11, 1916 |
| 232,514 | Lanphear | Sept. 21, 1880 |

FOREIGN PATENTS

| Number | Country | Date |
|---|---|---|
| 250,243 | Great Britain | Aug. 2, 1927 |
| 15,646 | Great Britain | 1892 |